(12) United States Patent
Justin et al.

(10) Patent No.: US 7,887,333 B1
(45) Date of Patent: Feb. 15, 2011

(54) CONFORMAL SLIP RING SYSTEM

(75) Inventors: Joseph E. Justin, Corona, CA (US);
Stephen T. Butscher, Riverside, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/573,274

(22) Filed: Oct. 5, 2009

(51) Int. Cl.
*H01R 39/00* (2006.01)
(52) U.S. Cl. ......................................................... 439/21
(58) Field of Classification Search .................... 439/21, 439/22, 23, 27, 29, 30
See application file for complete search history.

(56) References Cited

U.S. PATENT DOCUMENTS

| | | | |
|---|---|---|---|
| 4,444,459 A | | 4/1984 | Woodwell |
| RE34,693 E | * | 8/1994 | Plocek et al. ................. 439/15 |
| 6,048,211 A | * | 4/2000 | Liaom ............................ 439/4 |
| 6,633,266 B2 | | 10/2003 | Blen et al. |
| 6,921,269 B2 | * | 7/2005 | Johnson et al. ............... 439/13 |
| 2005/0279885 A1 | | 12/2005 | Tebon |

* cited by examiner

*Primary Examiner*—Phuong K Dinh
(74) *Attorney, Agent, or Firm*—Yee & Associates, P.C.; James M. Poole

(57) ABSTRACT

An apparatus comprises a first plate having a first plurality of conductive segments on a surface of the first plate and a second plate having a second plurality of conductive segments on a surface of the second plate. The first and second plates have an axis of rotation. The first plurality of conductive segments and the second plurality of conductive segments each have a circular shape with centers through the axis of rotation. Each of the first plurality of conductive segments and the second plurality of conductive segments has a different diameter. Portions of the first plurality of conductive segments and the second plurality of conductive segments are offset from each other along the axis of rotation. Corresponding segments in the first plurality of conductive segments and the second plurality of conductive segments conduct signals during rotation of the first plate and the second plate relative to each other.

21 Claims, 9 Drawing Sheets

CONFORMAL SLIP RING SYSTEM

BACKGROUND INFORMATION

1. Field:

The present disclosure relates generally to platforms with rotating structures and, in particular, to a method and apparatus for transferring signals between a rotating structure and a non-rotating structure.

2. Background:

Many types of platforms have structures that rotate relative to each other. These types of structures are found in various platforms, such as unmanned aircraft, manned aircraft, missiles, spacecraft, miniature robotics, ships, satellites, space stations, and other types of platforms.

With these types of platforms, signals may be transmitted between a rotating structure and a non-rotating structure on the platform. These signals may take the form of power and/or data. The signals may be optical and/or electrical. For example, a satellite may have a dish antenna. The dish antenna may be maintained in a stationary position relative to the earth, while the satellite may rotate. As another example, a robot may have a robotic arm that rotates.

Various mechanisms are used to provide connections to send signals between these types of structures. For example, slip rings, pre-twisted wire bundles, flexible tape cables, and mercury-filled rotary devices have been used to transmit signals between a rotating structure and a non-rotating structure.

With aircraft, spacecraft, and other similar vehicles, the size, shape, and weight of these types of platforms may influence the performance of the vehicles. Reductions in the size of various structures are desirable, because the reductions may result in decreased weight and volume. Additionally, these reductions also may provide a capability to reduce the number of structural components needed to support a rotating structure and a non-rotating structure with respect to each other. The reductions in structures may occur as the size of various devices and electronics or a platform decreases.

Many of the currently available mechanisms for transmitting signals between these types of structures, however, do not provide the desired amount of rotation. Further, as these structures decrease in size, mechanisms, such as flexible tape cables, rotary joints, pre-twisted wire bundles, and mercury-filled rotary devices may limit the design of structures because of the space requirements for these devices.

Therefore, it would be advantageous to have a method and apparatus that takes into account at least some of the issues discussed above, as well as possibly other issues.

SUMMARY

In one advantageous embodiment, an apparatus comprises a first plate having a first plurality of conductive segments on a surface of the first plate and a second plate having a second plurality of conductive segments on a surface of the second plate. The first plate has an axis of rotation. The first plurality of conductive segments has a circular shape with a first center through the axis of rotation. Each of the first plurality of conductive segments has a different diameter. Portions of the first plurality of conductive segments are offset from each other in the first plurality of conductive segments along the axis of rotation. The second plate has the axis of rotation. The second plurality of conductive segments has the circular shape with a second center through the axis of rotation. Each of the second plurality of conductive segments has a different diameter. Portions of the second plurality of conductive segments are offset from each other in the second plurality of conductive segments along the axis of rotation. The first plurality of conductive segments remain in communication with corresponding ones of the second plurality of conductive segments to conduct signals during rotation of the first plate and the second plate relative to each other.

In another advantageous embodiment, a method is present for transmitting signals. Signals are sent from a first structure in a platform into a conformal slip ring system comprising a first plate having a first plurality of conductive segments on a surface of the first plate and a second plate having a second plurality of conductive segments on a surface of the second plate. The first plate has an axis of rotation. The first plurality of conductive segments has a circular shape with a first center through the axis of rotation. Each of the first plurality of conductive segments has a different diameter. Portions of the first plurality of conductive segments are offset from each other in the first plurality of conductive segments along the axis of rotation. The second plate has the axis of rotation. The second plurality of conductive segments has the circular shape with a second center through the axis of rotation. Each of the second plurality of conductive segments has a different diameter. Portions of the second plurality of the conductive segments are offset from each other in the second plurality of conductive segments along the axis of rotation. The first plurality of conductive segments remain in communication with corresponding ones of the second plurality of conductive segments during rotation of the first plate and the second plate relative to each other. Signals are sent to a second structure in communication with the conformal slip ring system in response to receiving the signals from the first structure at the conformal slip ring system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
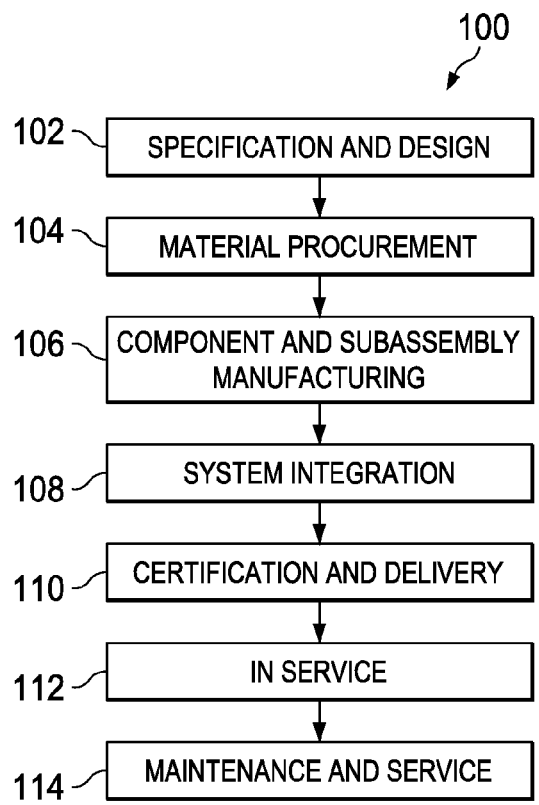
FIG. 1 is an illustration of a spacecraft manufacturing and service method in accordance with an advantageous embodiment.
Figure 2:
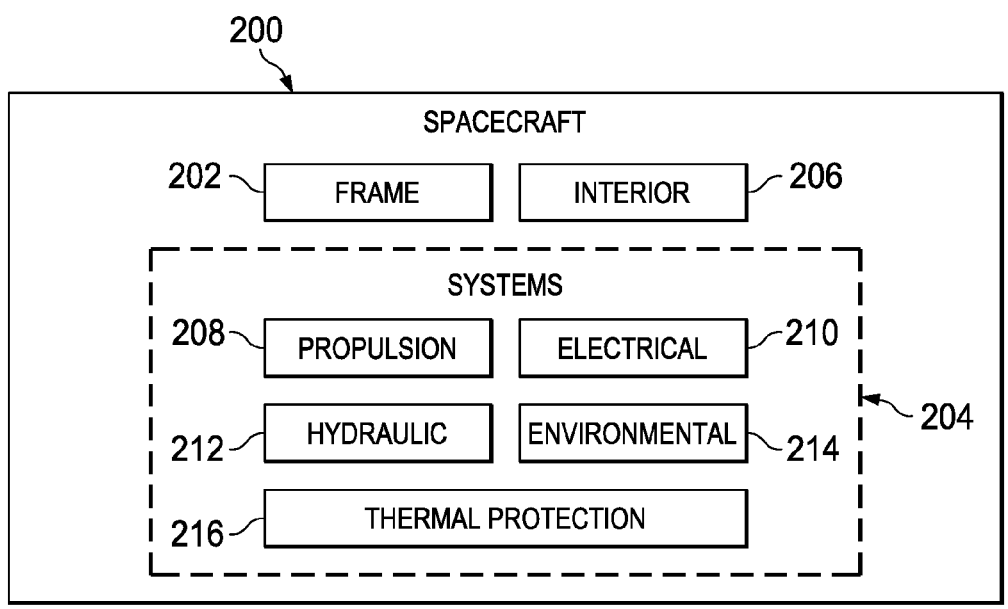
FIG. 2 is an illustration of a spacecraft in which an advantageous embodiment may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, an illustration of a spacecraft manufacturing and service method is depicted in accordance with an advantageous embodiment. During pre-production, spacecraft manufacturing and service method 100 may include specification and design 102 of spacecraft 200 in FIG. 2 and material procurement 104.

During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service 112 by a customer, spacecraft 200 in FIG. 2 is scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be a company, a military entity, a service organization, and so on.

With reference now to FIG. 2, an illustration of a spacecraft is depicted in which an advantageous embodiment may be implemented. In this illustrative example, spacecraft 200 is produced by spacecraft manufacturing and service method 100 in FIG. 1. Spacecraft 200 may include frame 202 with a plurality of systems 204 and interior 206.

Examples of plurality of systems 204 include one or more of propulsion system 208, electrical system 210, hydraulic system 212, environmental system 214, and thermal protection system 216. Although an aerospace example is shown, different advantageous embodiments may be applied to other industries, such as the automotive industry.

Apparatus and methods embodied herein may be employed during at least one of the stages of spacecraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while spacecraft 200 is in service 112 in FIG. 1. As yet another example, number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments are one or more apparatus embodiments. A number of apparatus embodiments, method embodiments, or a combination thereof may be utilized while spacecraft 200 is in service 112 and/or during maintenance and service 114 in FIG. 1. The use of a number of the different advantageous embodiments may substantially expedite the assembly of and/or reduce the cost of spacecraft 200.

The different advantageous embodiments recognize and take into account a number of different considerations. For example, the different advantageous embodiments recognize and take into account that currently available mechanisms for providing transmission signals between a rotating structure and a non-rotating structure with the desired amount of rotation may not have as small of a size as desired.

For example, the different advantageous embodiments recognize and take into account that current slip ring mechanisms may be used to transfer signals between a rotating structure and a non-rotating structure. These slip ring type structures include drum slip ring structures and plate slip ring structures. A drum slip ring structure has a cylinder in which rings of segments are arranged in a cylindrical fashion alternating between insulating and conductive segments in the cylinder.

A plate slip ring structure has rings of conductors alternating with insulators in a single plane to form two plates. The diameter of each ring increases in size as the ring is farther away from the center.

With a drum slip ring system, the number of conductors is directly proportional to the overall length of the cylinder. Thus, the different advantageous embodiments recognize and take into account that as the number of conductors increase, the cylinder becomes longer with respect to the diameter. This constraint can affect the size of a system in which a thicker component than desired may be needed to accommodate the length of the slip ring structure.

The different advantageous embodiments recognize and take into account that a plate slip ring system solves a length problem. This type of system is less complicated than using cylinders. This type of device increases in diameter.

The different advantageous embodiments also recognize and take into account that the flat shape of the components in the plate slip ring system may be more difficult to design or place into a structure with a curved surface. Depending on the requirements, the plate slip ring system may be reduced in size. The size of a plate slip ring system needed to fit in a structure with a curved shape may reduce the number of signals that can be transferred between structures that rotate relative to each other.

Thus, the different advantageous embodiments provide a method and apparatus for transferring signals using a conformal slip ring system. This system is configured to conform or follow a curved structure in which the conformal slip ring system may be used.

In one advantageous embodiment, an apparatus comprises a first plate and a second plate. The first plate has a plurality of conductive segments on a surface of the first plate. The first plurality of conductive segments has a circular shape with a first center through an axis of rotation. Each of the first plurality of conductive segments has a different diameter. Portions of the first plurality of conductive segments are offset from each other in the first plurality of conductive segments along the axis of rotation. The second plate has a second plurality of conductive segments on the surface of the second plate.

The second plurality of conductive segments has a circular shape with a second center through the axis of rotation. Each of the second plurality of conductive segments has a different diameter. Portions of the second plurality of conductive segments are offset from each other in the second plurality of conductive segments along the axis of rotation. The first plurality of conductive segments remain in communication with corresponding ones of the second plurality of conductive segments during rotation of the first plate and the second plate relative to each other. The first plate and the second plate have a shape that conforms to a curved surface.

Figure 3:
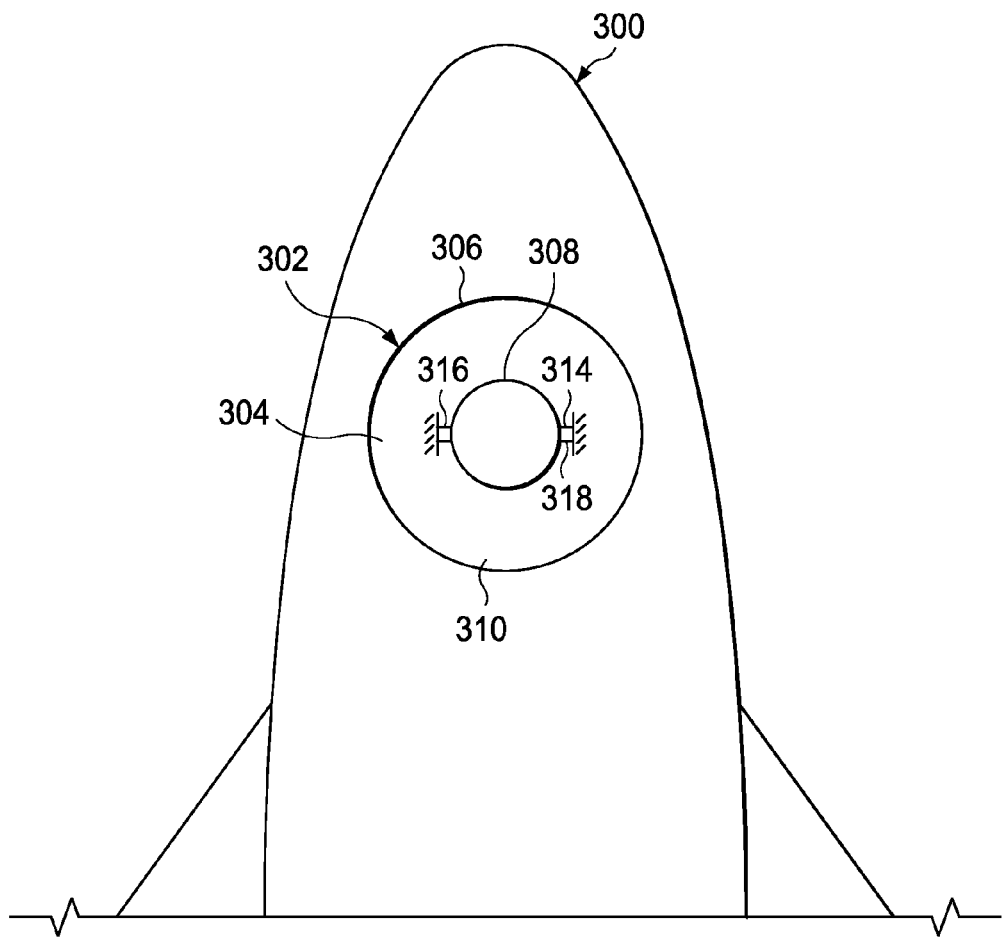
FIG. 3 is an illustration of an implementation for a spacecraft in accordance with an advantageous embodiment.

With reference now to FIG. 3, an illustration of one implementation for a spacecraft is depicted in accordance with an advantageous embodiment. In this illustrative example, spacecraft 300 is an example of one implementation for spacecraft 200 in FIG. 2.

In this depicted example, spacecraft 300 may carry payload 302. Payload 302 is satellite 304 in this particular example. Satellite 304 has rotating structure 306 and stationary structure 308. Rotating structure 306, in this example, takes the form of inertial measurement unit 310.

Rotating structure 306 is associated with stationary structure 308 through joints, such as joint 314 and joint 316. In this illustrative example, conformal slip ring system 318 is associated with joint 314. Conformal slip ring system 318 provides a capability to transfer signals between rotating structure 306 and stationary structure 308.

The illustration of spacecraft 300 with payload 302 in FIG. 3 is not meant to imply physical or architectural limitations to the manner in which other advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, rotating structure 306 may be part of spacecraft 300 rather than payload 302. For example, inertial measurement unit 310 may be located in spacecraft 300. Further, in other advantageous embodiments, additional joints, in addition to joints 314 and 316, may be present. Additionally, joints in addition to joints 314 and 316 may be present for inertial measurement unit 310 to allow a desired amount of rotation of additional axes.

In yet other advantageous embodiments, additional conformal slip ring systems may be present in addition to conformal slip ring system 318. For example, conformal slip ring system 318 also may be implemented in joint 316.

Figure 4:
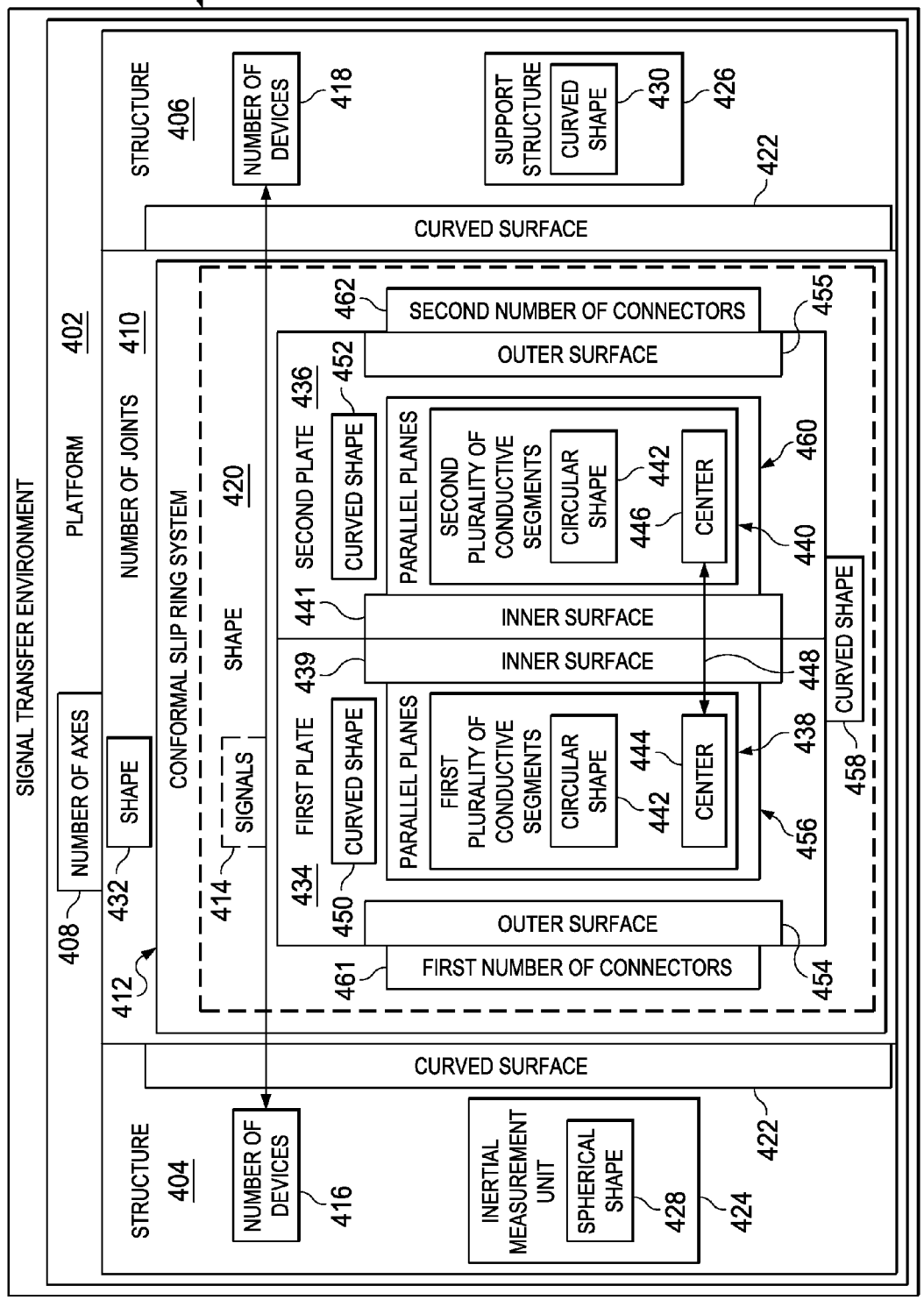
FIG. 4 is an illustration of a signal transfer environment in accordance with an advantageous embodiment.

Turning now to FIG. 4, an illustration of a signal transfer environment is depicted in accordance with an advantageous embodiment. Signal transfer environment 400 may be implemented using platform 402. Platform 402 may be, for example, spacecraft 200 in FIG. 2 or spacecraft 300 in FIG. 3.

Platform 402 has structure 404 and structure 406. In these illustrative examples, structure 404 and structure 406 may rotate relative to each other on number of axes 408. Structure 404 may be stationary, while structure 406 rotates. In some advantageous embodiments, both structure 404 and structure 406 may rotate.

In these illustrative examples, structure 404 and structure 406 are connected to each other using number of joints 410. Depending on the joints present in number of joints 410 and their configuration, different number of axes 408 may be present. In some advantageous embodiments, number of axes 408 may be one axis, while in other advantageous embodiments, two or three axes may be present. Of course, the axes within number of axes 408 may vary, depending on the particular embodiment.

One or more of number of joints 410 include conformal slip ring system 412 in these illustrative examples. Conformal slip ring system 412 facilitates the communication of signals 414 between structure 404 and structure 406. A communication of signals 414 means that signals 414 may be transferred from structure 404 to structure 406 and/or structure 406 to structure 404.

This exchange of signals may occur while structure 404 and structure 406 rotate relative to each other. The rotation of structure 404 and structure 406 relative to each other means one or both of these structures may rotate. For example, both structure 404 and structure 406 may rotate relative to each other or structure 404 may be stationary, while structure 406 rotates.

Signals 414 may take various forms. For example, signals 414 may be electrical and/or optical signals. Further, signals 414 may carry data or supply power. In these examples, signals 414 may be transferred between number of devices 416 in structure 404 and number of devices 418 in structure 406.

As illustrated, conformal slip ring system 412 has shape 420 that may conform to curved surface 422 in at least one of structure 404 and structure 406. Curved surface 422 may be, for example, an exterior surface of at least one of structure 404 and structure 406. Curved surface 422 may be a surface inside of at least one of structure 404 and structure 406.

For example, structure 404 may be inertial measurement unit 424, and structure 406 may be support structure 426. Inertial measurement unit 424 may have spherical shape 428. Additionally, support structure 426 may have curved shape 430 that substantially conforms to spherical shape 428. In these illustrative examples, shape 420 of conformal slip ring system 412 may be spherical or substantially spherical to follow at least one of inertial measurement unit 424 and support structure 426. In this manner, shape 420 of conformal slip ring system 412 conforms to at least one of spherical shape 428 and curved shape 430 rather than requiring changes to those shapes.

Number of joints 410 may connect inertial measurement unit 424 to support structure 426. Curved surface 422 may be located on at least one of inertial measurement unit 424 and support structure 426. As a result, number of joints 410 may have shape 432 that conforms to curved surface 422. When conformal slip ring system 412 is implemented within number of joints 410, shape 420 of conformal slip ring system 412 also may conform to curved surface 422.

Conforming to curved surface 422 means that a structure substantially follows or follows as closely as possible the curved surface. Conforming to curved surface 422 does not require a shape to touch or conform to curved surface 422.

In this illustrative example, conformal slip ring system 412 comprises first plate 434 and second plate 436. First plate 434 has first plurality of conductive segments 438. Second plate 436 has second plurality of conductive segments 440. First plurality of conductive segments 438 and second plurality of conductive segments 440 both have circular shape 442. The different conductive segments in first plurality of conductive segments 438 are concentric to each other. In a similar fashion, the conductive segments in second plurality of conductive segments 440 are also concentric to each other.

In other words, each segment within first plurality of conductive segments 438 and second plurality of conductive segments 440 has the shape of a circle. First plurality of conductive segments 438 has center 444 in which each of first plurality of conductive segments 438 has a different diameter. In a similar fashion, second plurality of conductive segments 440 has center 446 in which each of second plurality of conductive segments 440 has a different diameter.

Center 444 and center 446 may have axis of rotation 448 when first plate 434 and second plate 436 are assembled to form conformal slip ring system 412. In these illustrative examples, first plate 434 and second plate 436 are not flat plates. Instead, first plate 434 has curved shape 450, and second plate 436 has curved shape 452.

With these curved shapes, portions of first plurality of conductive segments 438 on inner surface 439 of first plate 434 are offset from each other. Portions of first plurality of conductive segments 438 are located on parallel planes 456 in which each plane in parallel planes 456 is offset from the other planes in parallel planes 456.

For example, one portion of first plurality of conductive segments 438 is located on a first parallel plane in parallel planes 456, while another portion of first plurality of conductive segments 438 is located on another parallel plane in parallel planes 456 that is offset from the first parallel plane.

In a similar fashion, portions of second plurality of conductive segments 440 on inner surface 441 of second plate 436 are offset from each other in second plurality of conductive segments 440. Portions of second plurality of conductive segments 440 are also located on parallel planes 460 in which each plane in parallel planes 460 is offset from the other planes in parallel planes 460.

Further, first plurality of conductive segments 438 remains in communication with corresponding ones of second plurality of conductive segments 440 during rotation of first plate 434 and second plate 436 relative to each other in conformal slip ring system 412. In other words, a conductive segment within first plurality of conductive segments 438 remains in communication with another segment in second plurality of conductive segments 440, while first plate 434 and second plate 436 rotate relative to each other. One plate may rotate while the other plate remains stationary, or both plates may rotate in these examples.

With this arrangement of first plurality of conductive segments 438 and second plurality of conductive segments 440, first plate 434 has outer surface 454 that is curved. Additionally, second plate 436 also has outer surface 455 that is curved. The curves on outer surface 454 and outer surface 455 may form curved shape 450 for first plate 434 and curved shape 452 for second plate 436, respectively. These curved shapes provide curved shape 458 for an assembly of first plate 434 and second plate 436 in conformal slip ring system 412.

In these illustrative examples, first number of connectors 461 on outer surface 454 of first plate 434 provides a connection to first plurality of conductive segments 438. Second number of connectors 462 on outer surface 455 of second plate 436 provides a connection to second plurality of conductive segments 440.

In these illustrative examples, first plate 434 and second plate 436 may be comprised of a number of different types of materials. For example, these materials may be plastic, a composite material, a dielectric, an insulator, and/or some other suitable type of material. In these illustrative examples, insulators may be used for first plate 434 and second plate 436. In these examples, first plate 434 and second plate 436 may be manufactured from materials similar to those used for printed circuit boards. For example, layers of dielectric may be laminated with an epoxy resin prepreg to form the structures for first plate 434 and second plate 436.

These materials may include, for example, polytetrafluoroethylene and/or other suitable materials. A prepreg material that may be used includes, for example, without limitation, phenolic cotton paper, cotton paper and epoxy, woven glass and epoxy, matte glass and polyester, and other suitable materials. First plurality of conductive segments 438 and second plurality of conductive segments 440 may be, for example, without limitation, copper foil placed on the surfaces of first plate 434 and second plate 436, respectively.

In some advantageous embodiments, first plurality of conductive segments 438 is a plurality of brushes located on the surface of first plate 434, while second plurality of conductive segments 440 is a plurality of conductive lines on the surface of second plate 436. The plurality of conductive lines may be metal lines, such as those formed on printed circuit boards using copper. Each conductive segment in first plurality of conductive segments 438 is one brush in these examples. Each conductive segment in second plurality of conductive segments 440 is one conductive line.

In yet other advantageous embodiments, first plurality of conductive segments 438 may be a plurality of ridges that are conductive, while second plurality of conductive segments 440 may be a plurality of grooves that are conductive. Of course, in other advantageous embodiments, first plurality of conductive segments 438 and second plurality of conductive segments 440 may be configured to communicate optical signals in addition to or instead of electrical signals.

The illustration of signal transfer environment 400 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional conformal slip ring systems may be present in addition to conformal slip ring system 412 for use in other joints in number of joints 410. Further, other structures that rotate relative to each other may be present in addition to structure 404 and structure 406 in which joints containing conformal slip ring systems, such as conformal slip ring system 412, may be present. As another example, in some advantageous embodiments, a conductive segment may have more than one conductive line, depending on the implementation.

Figure 5:
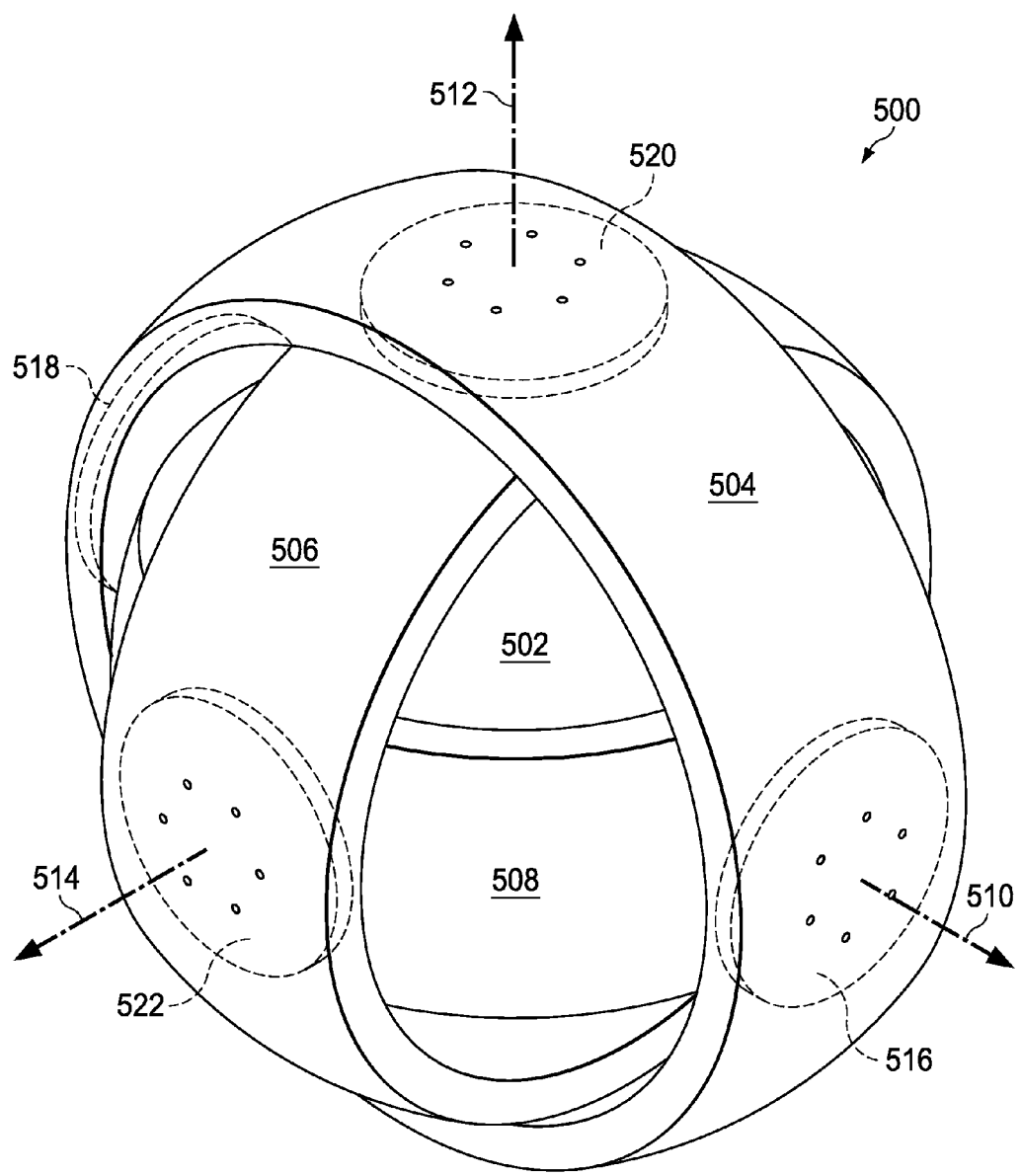
FIG. 5 is an illustration of a platform in accordance with an advantageous embodiment.

With reference now to FIG. 5, an illustration of a platform is depicted in accordance with an advantageous embodiment. In this illustrative example, a portion of platform 500 is depicted. Platform 500 may be, for example, without limitation, spacecraft 200 in FIG. 2, spacecraft 300 in FIG. 3, satellite 304 in FIG. 3, or some other suitable platform.

In this illustrative example, inertial measurement unit 502 is located within platform 500. Inertial measurement unit 502 is supported by structure 504, structure 506, and structure 508. These structures also may be referred to as gimbals.

Structure 504 rotates about axis 510, structure 506 rotates about axis 512, and structure 508 rotates about axis 514. In this manner, inertial measurement unit 502 may rotate about three different axes.

Structure 504, structure 506, and structure 508 are connected to each other through joints. In this example, joints 516, 518, 520, and 522 are shown. Conformal slip ring system 412 in FIG. 4 may be implemented or associated with joints 516 and 518, in these examples, as described in more detail below.

Figure 6:
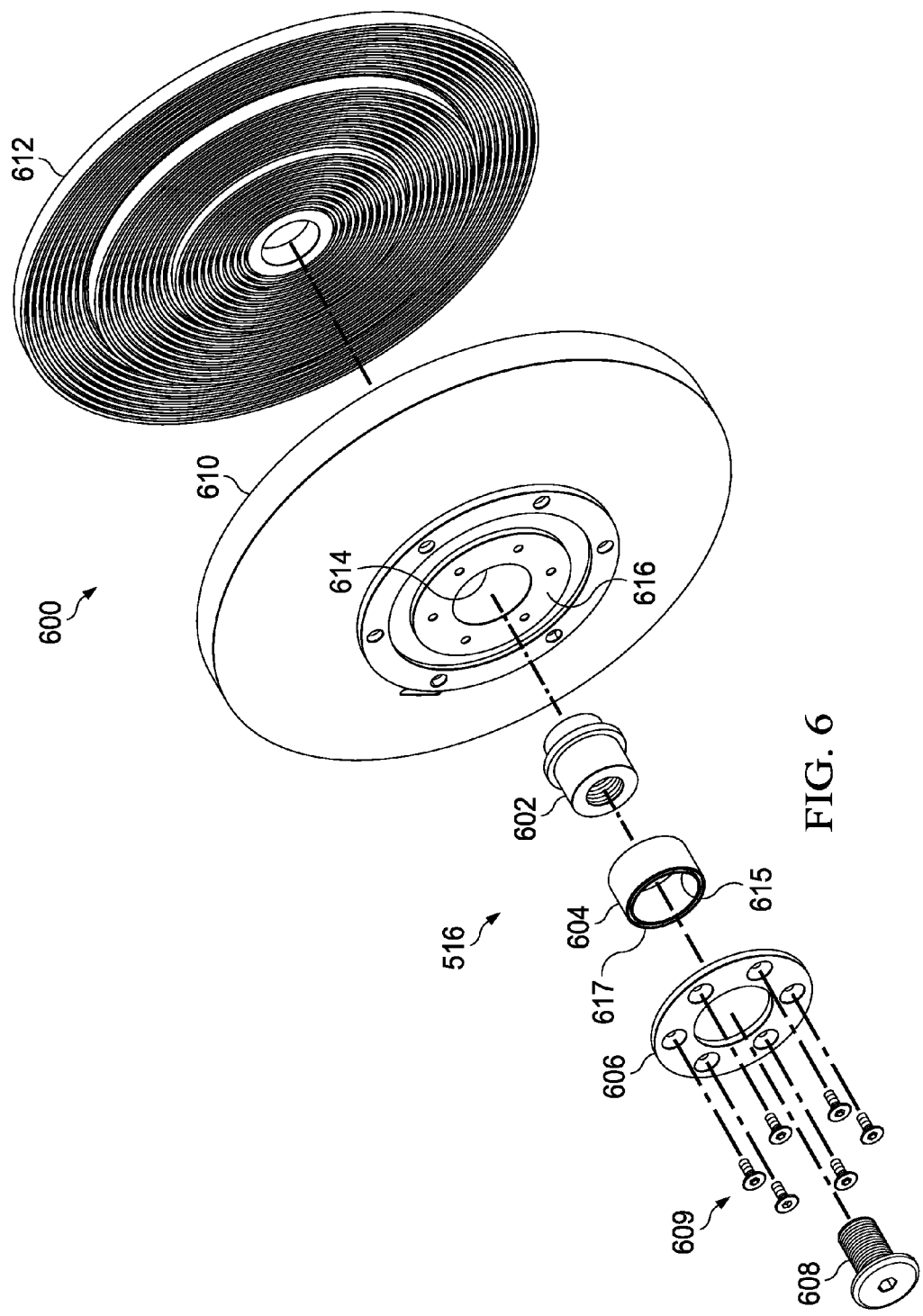
FIG. 6 is an illustration of an exploded view of a joint with a conformal slip ring system in accordance with an advantageous embodiment.

With reference now to FIG. 6, an illustration of an exploded view of a joint with a conformal slip ring system is depicted in accordance with an advantageous embodiment. In this illustrative example, a portion of joint 516 is shown in an exploded view with conformal slip ring system 600. Conformal slip ring system 600 is an example of one implementation for conformal slip ring system 412 in FIG. 4.

As illustrated, joint 516 comprises shaft 602, bearing 604, outer race retainer 606, and inner race retainer 608. Outer race retainer 606 may be secured to conformal slip ring system 600 by fasteners 609.

Conformal slip ring system 600 comprises first plate 610 and second plate 612. Both first plate 610 and second plate 612 have a curved shape. In this view, opening 614 is seen in first plate 610. First plate 610 has outer surface 616. An opening also is present in second plate 612 but not shown in this view.

As illustrated, shaft 602 may be placed into opening 614 of first plate 610 and second plate 612. Bearing 604 may be placed over shaft 602. Inner race retainer 608 may clamp inner race 615 of bearing 604 to shaft 602. Ball bearings may be present to allow for movement. Bearing 604 may be placed through opening 614 in first plate 610. Outer race retainer 606 clamps outer race 617 of bearing 604 to first plate 610 using fasteners 609.

Figure 7:
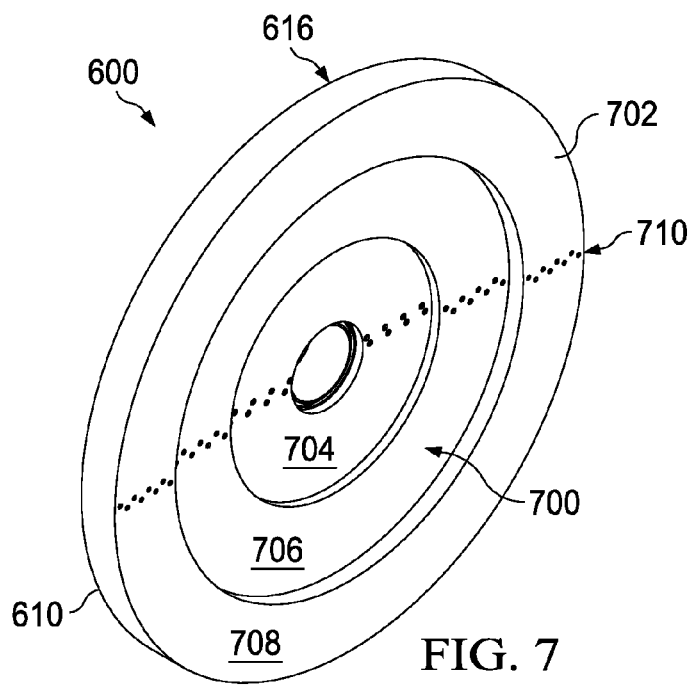
FIG. 7 is an illustration of a plate in a conformal slip ring system in accordance with an advantageous embodiment.

Turning now to FIG. 7, an illustration of a plate in a conformal slip ring system is depicted in accordance with an advantageous embodiment. In this illustrative example, another view of first plate 610 is depicted.

In this illustrative example, first plate 610 has first plurality of conductive segments 700 located on inner surface 702 of first plate 610. In this illustrative example, first plurality of conductive segments 700 has different portions located on parallel planes.

For example, first plurality of conductive segments 700 on inner surface 702 has portions 704, 706, and 708. These portions are offset from each other in this view. Each portion may be on a plane that is offset from the other planes for the other portions. In this manner, outer surface 616 may have a curved shape that may conform to a surface or other structure.

In these illustrative examples, first plurality of conductive segments 700 include brushes 710. In this illustrative example, each conductive segment in conductive segments 700 comprises a single brush in brushes 710. Portions of brushes 710 are found in portions 704, 706, and 708 of first plurality of conductive segments 700 in this illustrative example. As depicted in this example, each of portions 704, 706, and 708 are comprised of eight conductive segments in which each conductive segment is a single brush.

Of course, other numbers of segments may be present in each portion. For example, in some advantageous embodiments, one segment, five segments, 20 segments, or some other suitable number of segments may be present in a portion.

Further, different portions may have different numbers of segments. As another example, portion 704 may have eight segments, portion 706 may have 10 segments, and portion 708 may have three segments. The number of segments and the number of portions on first plate 610 may vary, depending on a desired curved shape for outer surface 616 of first plate 610.

Figure 8:
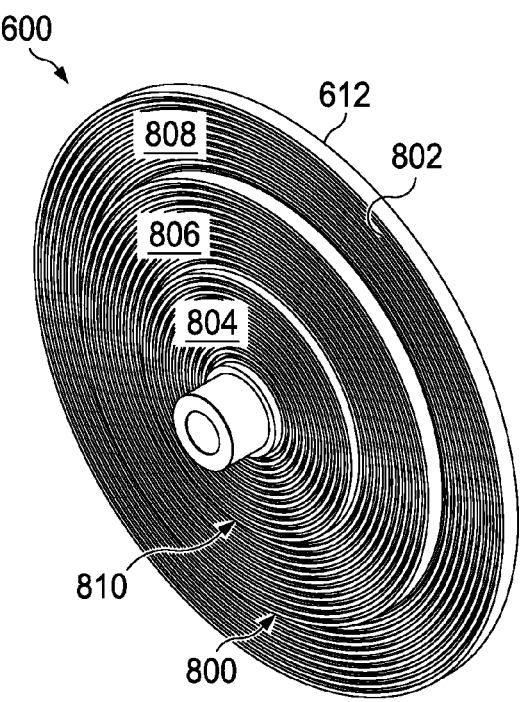
FIG. 8 is an illustration of a plate in a conformal slip ring system in accordance with an advantageous embodiment.

With reference now to FIG. 8, an illustration of a plate in a conformal slip ring system is depicted in accordance with an advantageous embodiment. In this illustrative example, second plate 612 is illustrated.

Second plate 612 has second plurality of conductive segments 800 located on inner surface 802 of second plate 612. In this example, second plurality of conductive segments 800 may be divided into portions 804, 806, and 808. Each portion is offset from another portion of second plurality of conductive segments 800. In this example, each portion may be aligned with a plane that is parallel and offset from other planes for the other portions.

In these illustrative examples, second plurality of conductive segments 800 comprises conductive lines 810. Conductive lines 810 may be, for example, lines of copper separated from each other with a distance such that signals in one conductive line do not cross over to another conductive line.

In this illustrative example, first plurality of conductive segments 700 on first plate 610 in FIG. 7 and second plurality of conductive segments 800 on second plate 612 may remain in contact with each other when first plate 610 and second plate 612 rotate relative to each other in an assembled form. For example, portion 704 on first plate 610 may contact portion 804 on second plate 612. Portion 706 on first plate 610 may contact portion 806 on second plate 612. Portion 708 on first plate 610 may contact portion 808 on second plate 612.

Second plurality of conductive segments 800 may be offset in a manner to allow for an outer surface of second plate 612, not seen in this view, to have a curved shape. The number of conductive segments in each portion and the number of portions for second plate 612 may be selected to obtain a desired curved shape for the outer surface of second plate 612.

Figure 9:
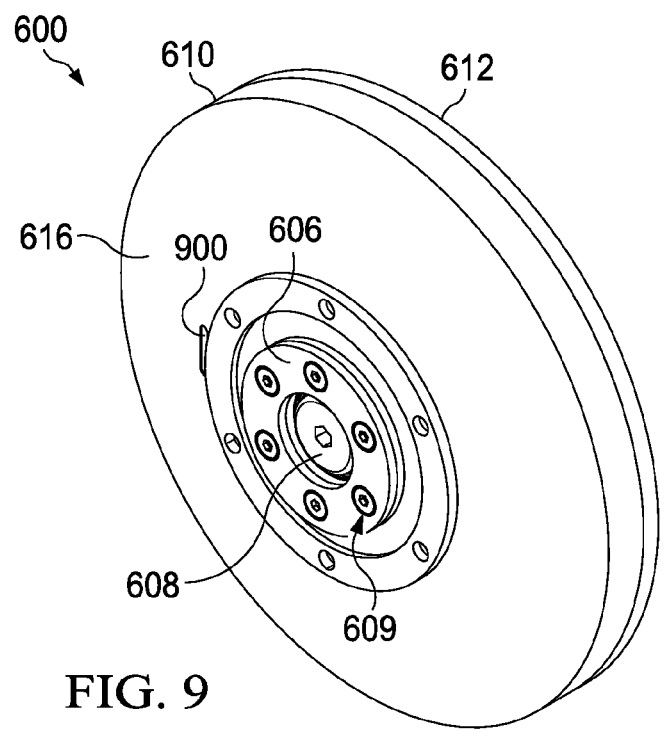
FIG. 9 is an illustration of a perspective view of a conformal slip ring system in accordance with an advantageous embodiment.

With reference now to FIG. 9, an illustration of a perspective view of a conformal slip ring system is depicted in accordance with an advantageous embodiment. In this illustrative example, outer surface 616 of first plate 610 may be seen. As depicted, first plate 610 and second plate 612 have been connected to each other to form conformal slip ring system 600.

Additionally, connector 900 is seen on first plate 610. Connector 900 may be connected to first plurality of conductive segments 700 on inner surface 702 of first plate 610.

Figure 10:
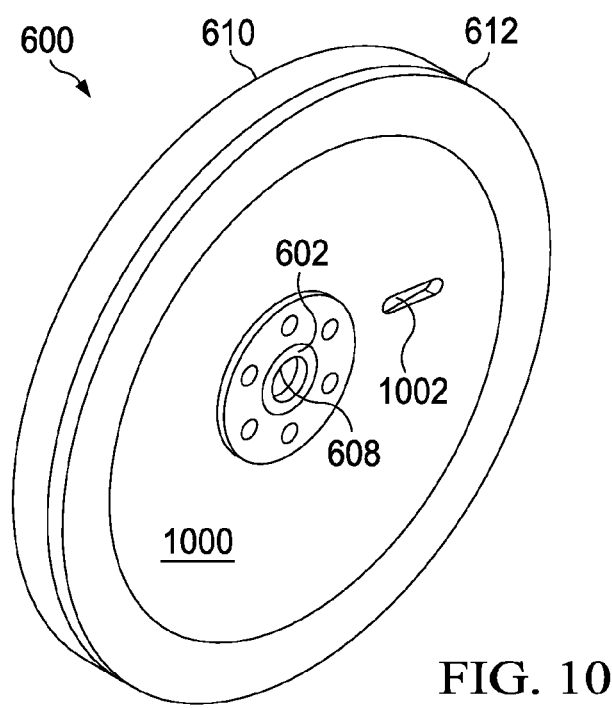
FIG. 10 is an illustration of a conformal slip ring system in accordance with an advantageous embodiment.

With reference now to FIG. 10, an illustration of a conformal slip ring system is depicted in accordance with an advantageous embodiment. In this view, first plate 610 and second plate 612 have been assembled for conformal slip ring system 600. In this view, outer surface 1000 for second plate 612 is illustrated. As depicted, outer surface 1000 is curved. Additionally, connector 1002 also is shown on outer surface 1000 of second plate 612. Connector 1002 provides a connection to second plurality of conductive segments 800 on inner surface 802 of second plate 612.

Figure 11:
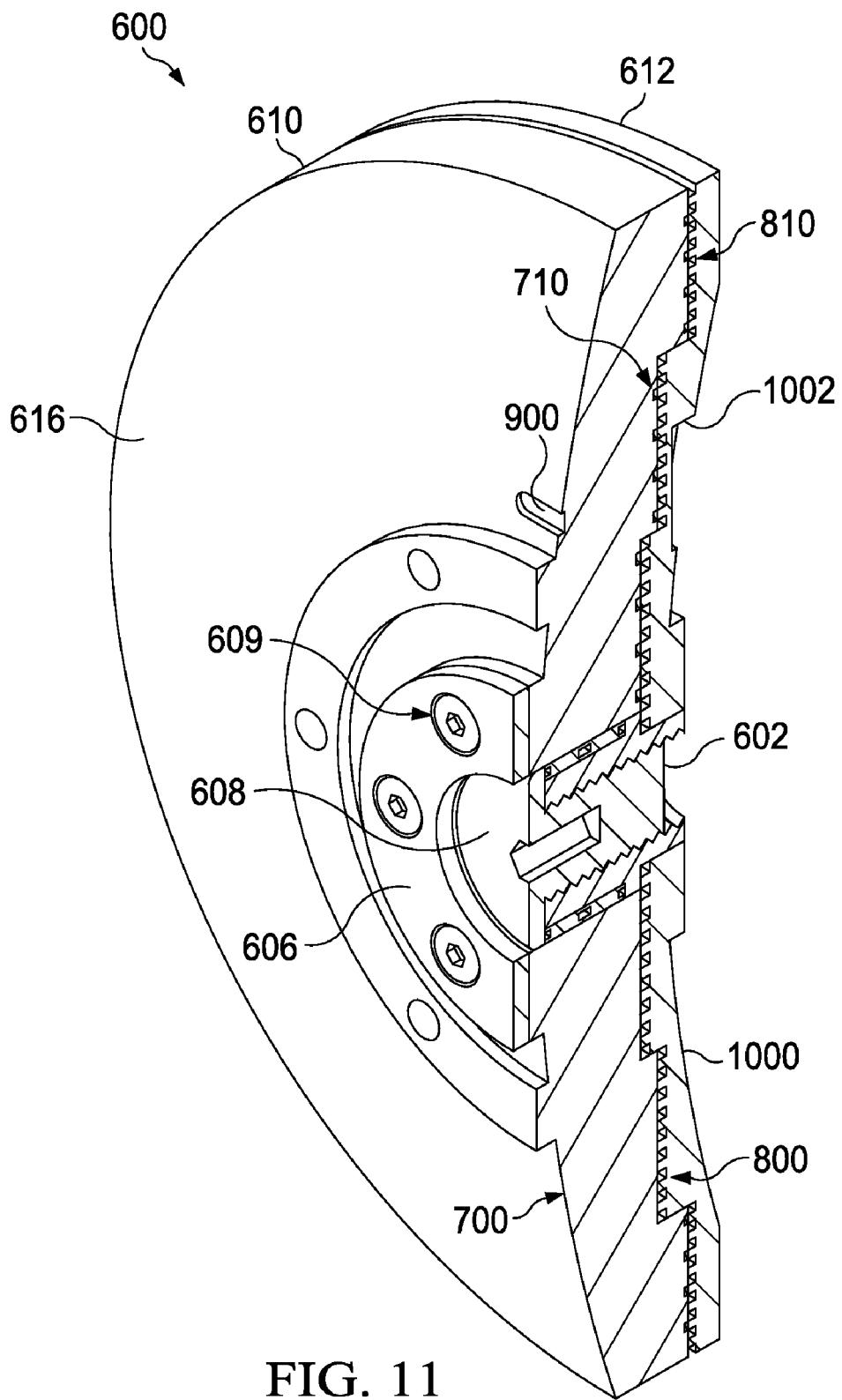
FIG. 11 is an illustration of a cross-sectional perspective view of a conformal slip ring system in accordance with an advantageous embodiment.

With reference now to FIG. 11, an illustration of a cross-sectional perspective view of a conformal slip ring system is depicted in accordance with an advantageous embodiment. In this illustrative example, a cross-sectional view of conformal slip ring system 600 is depicted. As can be seen, outer surface 616 and outer surface 1000 both have a curved shape. This curved shape provides a curved shape for conformal slip ring system 600. This curved shape makes it possible for conformal slip ring system 600 to be used with structures that may have curved surfaces or structures. As a result, a redesign or change in the structures may be unnecessary with conformal slip ring system 600.

Figure 12:
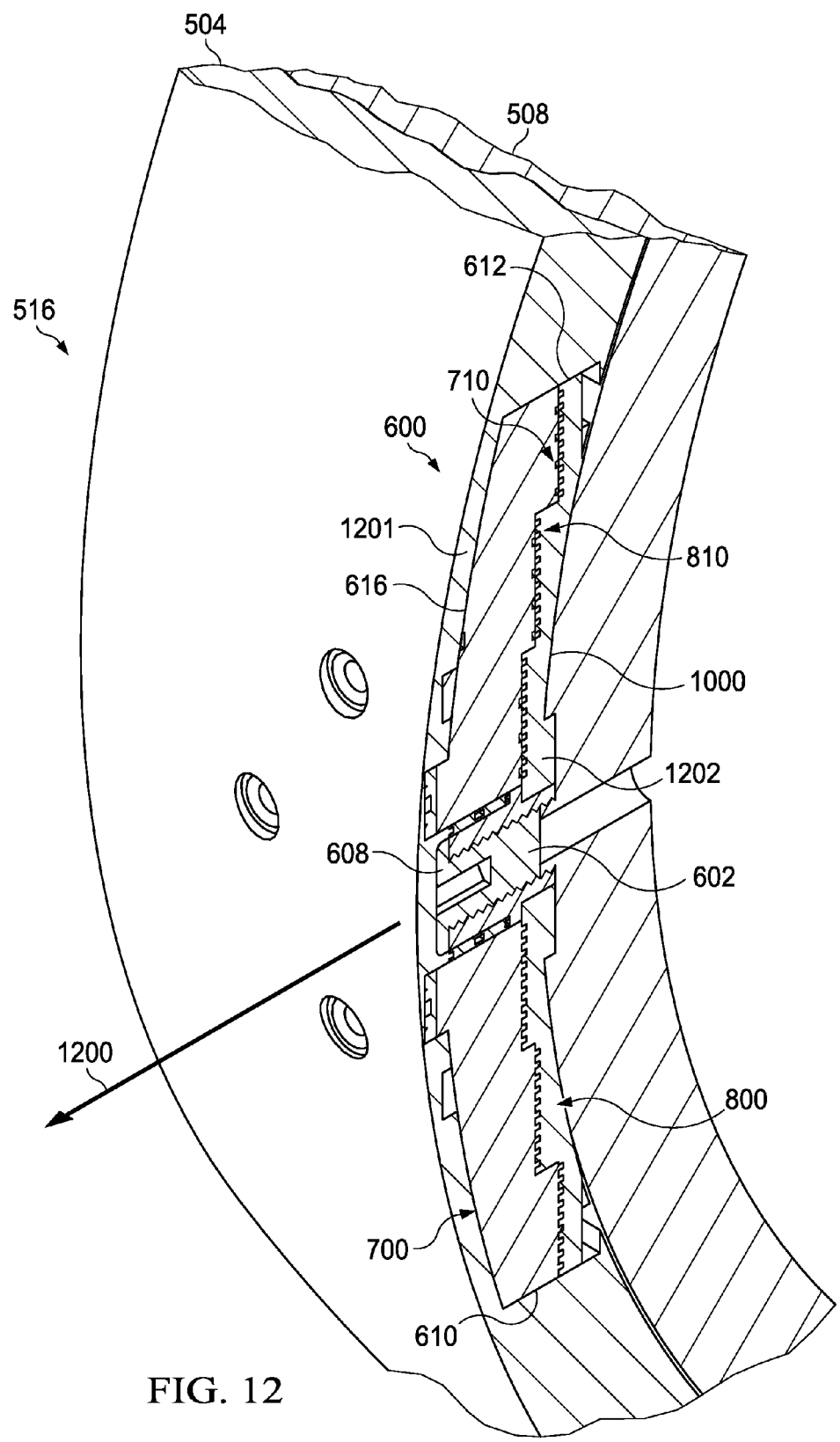
FIG. 12 is an illustration of a conformal slip ring system within a joint connecting two structures to each other in accordance with an advantageous embodiment.

With reference now to FIG. 12, an illustration of a conformal slip ring system within a joint connecting two structures to each other is depicted in accordance with an advantageous embodiment. In this illustrative example, a cross-sectional perspective view of conformal slip ring system 600 is depicted within joint 516. Joint 516 connects structure 504 to structure 508 in a manner that allows for rotation between structure 504 and structure 508 about axis 1200.

As can be seen in this example, conformal slip ring system 600 has a curved shape that conforms to both structure 504 and structure 508. Outer surface 616 of first plate 610 conforms to surface 1201 of structure 504. Outer surface 1000 of second plate 612 conforms to surface 1202 of structure 508. As can be seen, this shape for conformal slip ring system 600 may avoid needing a change in the shape of structure 504 and structure 508 when implementing joint 516.

Figure 13:
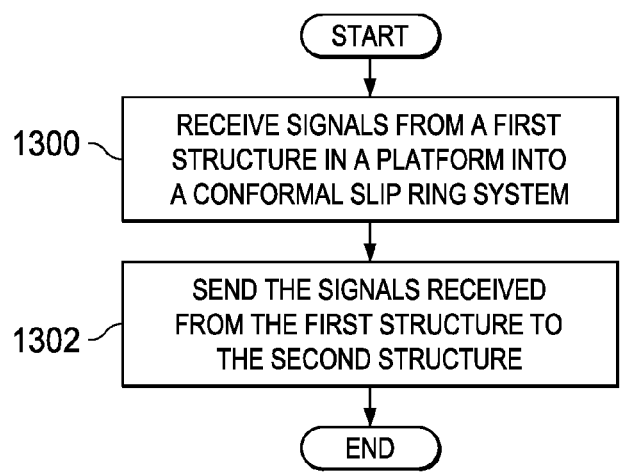
FIG. 13 is an illustration of a flowchart of a process for transmitting signals in accordance with an advantageous embodiment.

With reference now to FIG. 13, an illustration of a flowchart of a process for transmitting signals is depicted in accordance with an advantageous embodiment. The process illustrated in FIG. 13 may be implemented in signal transfer environment 400 in FIG. 4. For example, these signals may be transferred using conformal slip ring system 412 to transfer signals between structure 404 and structure 406. The transfer of signals may occur while the structures are stationary or while these structures rotate relative to each other.

The process begins by receiving the signals from a first structure in a platform into the conformal slip ring system (operation 1300). The process then sends these signals received from the first structure to the second structure (operation 1302), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, in FIG. 13, these signals also may be sent from the second structure to the first structure. Additionally, in some illustrative examples, the conformal slip ring system may include components for a joint in which the conformal slip ring system is associated. In some advantageous embodiments, the conformal slip ring system may be considered to include the first plate, the second plate, and all of the components for the joint.

Thus, the different advantageous embodiments provide a method and apparatus for transferring signals between a first structure and a second structure. In one advantageous embodiment, an apparatus may comprise a first plate and a second plate. The first plate has a first plurality of conductive segments on a surface of the first plate. Each of the first plurality of conductive segments is circular and concentric to other segments in the first plurality of conductive segments. In other words, each of the first plurality of conductive segments has a different diameter but a common center.

Further, portions of the first plurality of conductive segments are offset from each other. The second plate has a second plurality of conductive segments on a surface of the second plate. Each of the second plurality of conductive segments is circular and concentric to other segments in the second plurality of conductive segments. This arrangement of the conductive segments is such that the first plurality of conductive segments remains in communication with corresponding ones of the second plurality of conductive segments during rotation of the first plate and the second plate to each other. The assembly of the first plate and the second plate has a shape that conforms to a curved surface.

In this manner, the different advantageous embodiments may allow for use of a slip ring system that may conform to the shape of at least one of a first structure and a second structure that are connected to each other and may rotate relative to each other. Further, the conformal slip ring system in the different advantageous embodiments allows for larger numbers of conductive segments to be used as compared to currently available slip ring systems that have flat plates in which the different conductive segments are arranged substantially along a single plane.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a first plate having a first plurality of conductive segments on a surface of the first plate, wherein the first plate has an axis of rotation, the first plurality of conductive segments has a circular shape with a first center through the axis of rotation, each of the first plurality of conductive segments has a different diameter, and portions of the first plurality of conductive segments are offset from each other in the first plurality of conductive segments along the axis of rotation; and
a second plate having a second plurality of conductive segments on a surface of the second plate, wherein the second plate has the axis of rotation, the second plurality of conductive segments has the circular shape with a second center through the axis of rotation, each of the second plurality of conductive segments has the different diameter, portions of the second plurality of conductive segments are offset from each other in the second plurality of conductive segments along the axis of rotation, and the first plurality of conductive segments remain in communication with corresponding ones of the second plurality of conductive segments to conduct signals during rotation of the first plate and the second plate relative to each other.

2. The apparatus of claim 1, wherein the first plate has an outer surface that is curved and the second plate has an outer surface that is curved.

3. The apparatus of claim 1, wherein an assembly of the first plate and the second plate forms a conformal slip ring system with a curved shape.

4. The apparatus of claim 1, wherein the each of the first plurality of conductive segments comprises a number of ridges and the each of the second plurality of conductive segments comprises a number of grooves.

5. The apparatus of claim 1, wherein the each of the first plurality of conductive segments comprises a number of grooves and the each of the second plurality of conductive segments comprises a number of ridges.

6. The apparatus of claim 1, wherein the each of the first plurality of conductive segments comprises a number of conductive lines and the each of the second plurality of conductive segments comprises a number of brushes.

7. The apparatus of claim 1, wherein the first plate is associated with a first structure in a platform, the second plate is associated with a second structure in the platform, and the first structure and the second structure rotate relative to each other.

8. The apparatus of claim 7, wherein the first plate and the second plate are part of a joint configured to moveably connect the first structure to the second structure.

9. The apparatus of claim 1 further comprising:
a first structure; and
a second structure, wherein the first structure and the second structure rotate relative to each other, the first plate is associated with the first structure, and the second plate is associated with the second structure.

10. The apparatus of claim 9 further comprising:
a joint connecting the first structure to the second structure, wherein an assembly of the first plate and the second plate is associated with the joint.

11. The apparatus of claim 3 further comprising:
a first structure; and
a second structure, wherein the first structure and the second structure rotate relative to each other, the first plate is associated with the first structure, the second plate is associated with the second structure, at least one of the first structure and the second structure has a curved surface, and the curved shape of the conformal slip ring system conforms to the curved surface.

12. The apparatus of claim 1 further comprising:
a first number of connectors connected to the first plurality of conductive segments; and
a second number of connectors connected to the second plurality of conductive segments.

13. The apparatus of claim 1, wherein the signals are selected from at least one of electrical signals and optical signals.

14. The apparatus of claim 7, wherein the first structure is an inertial measurement unit and the second structure is a moveable support for the inertial measurement unit.

15. The apparatus of claim 7 further comprising:
the platform.

16. The apparatus of claim 15, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, and an automobile.

17. A method for transmitting signals, the method comprising:
sending the signals from a first structure in a platform into a conformal slip ring system comprising a first plate having a first plurality of conductive segments on a surface of the first plate, wherein the first plate has an axis of rotation, the first plurality of conductive segments has a circular shape with a first center through the axis of rotation, each of the first plurality of conductive segments has a different diameter, and portions of the first plurality of conductive segments are offset from each other in the first plurality of conductive segments along the axis of rotation; and a second plate having a second plurality of conductive segments on a surface of the second plate, wherein the second plate has the axis of rotation, the second plurality of conductive segments has the circular shape with a second center through the axis of rotation, each of the second plurality of conductive segments has the different diameter, portions of the second plurality of the conductive segments are offset from each other in the second plurality of conductive segments along the axis of rotation, and the first plurality of conductive segments remains in communication with corresponding ones of the second plurality of conductive segments during rotation of the first plate and the second plate relative to each other; and
responsive to receiving the signals from the first structure at the conformal slip ring system, sending the signals to a second structure in communication with the conformal slip ring system.

18. The method of claim 17 further comprising:
sending additional signals from the second structure to the conformal slip ring system; and
responsive to receiving the additional signals from the second structure at the conformal slip ring system, sending the additional signals to the first structure in communication with the conformal slip ring system.

19. The method of claim 17, wherein the signals are selected from at least one of electrical signals and optical signals.

20. The method of claim 17, wherein the first plate is associated with the first structure in the platform, the second plate is associated with the second structure in the platform, and the first structure and the second structure rotate relative to each other.

21. The method of claim 20, wherein the first plate and the second plate are part of a joint configured to moveably connect the first structure to the second structure.

* * * * *